July 4, 1939.  W. G. WILSON  2,164,729
EPICYCLIC POWER TRANSMISSION MECHANISM
Filed March 21, 1938  2 Sheets-Sheet 1

W. G. Wilson
INVENTOR
By Glascock Downing & Seebold
Attys.

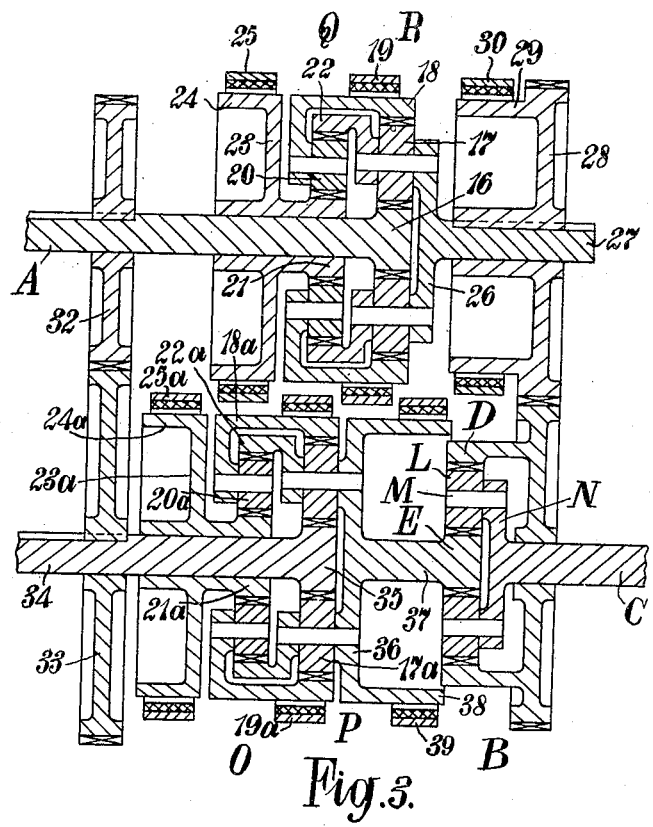

Patented July 4, 1939

2,164,729

UNITED STATES PATENT OFFICE 2,164,729

EPICYCLIC POWER TRANSMISSION MECHANISM

Walter Gordon Wilson, Westminster, London, England

Application March 21, 1938, Serial No. 197,293
In Great Britain March 5, 1937

1 Claim. (Cl. 74—267)

This invention relates to power transmission mechanism and more particularly to driving mechanism of the epicyclic and constant mesh type.

The object of the invention to be hereinafter described is a driving mechanism by which a considerable number of speed changes are obtainable, is simple to operate, and which will keep within practical constructional limits.

The invention consists in a power driving unit comprising a main epicyclic group in which the sun pinion and the annulus are independently and variably driven through selective driving mechanism from a single input shaft, the associated planet pinions of such group being in operative connection with the output shaft.

The invention will now be described with reference to the accompanying drawings in which:

Figures 3 and 4 show other forms of gearing according to the invention.

Figure 1:
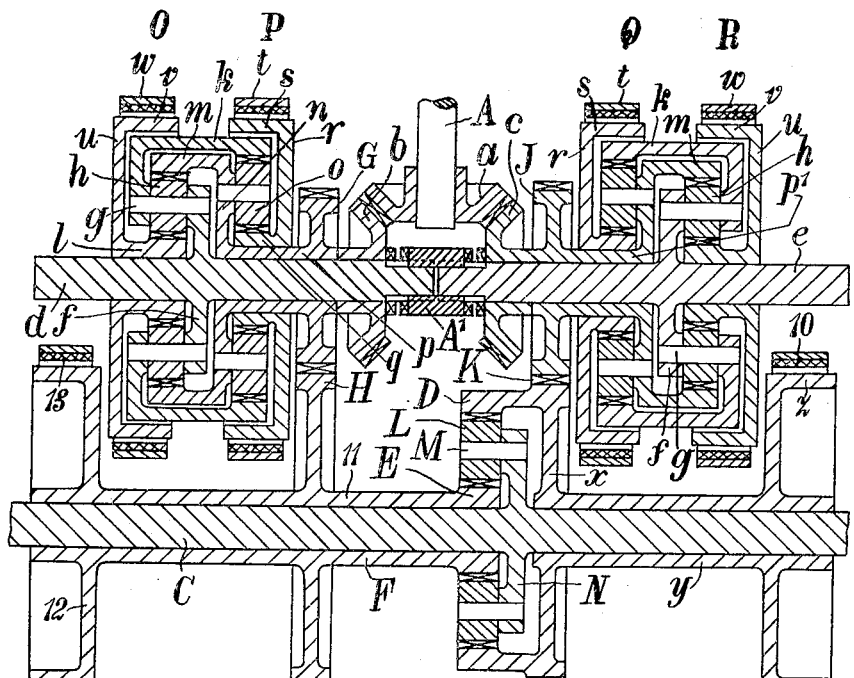
Figure 1 is a diagrammatic plan view in section showing one example of a form of gearing constructed according to the invention.

In carrying the invention into effect, the input drive A from the engine is divided or split in such a way that a variable driving effort is imposed upon a main epicyclic group B, the planetary system of which furnishes the drive to the output shaft C. For this purpose the input shaft A is designed to act upon the internally toothed annulus D of the main group, whilst the sun pinion E of such group is driven by an auxiliary shaft F that is geared to, and driven by, the input shaft A.

In one embodiment, the input shaft A drives the auxiliary shaft F through a pair of gear wheels G, H which may be of equal or different ratio but herein shown as unequal, and is also adapted by means of gear wheels J, K to drive the internally toothed annulus of the main epicyclic group, which is thus both externally and internally toothed. Such main epicyclic group B comprises the sun pinion driven by the auxiliary shaft as described, the associated planet pinions L and the annulus above mentioned. The planet pinions are fitted on stub axles M supported on a frame N mounted on the output shaft C.

From this it will be understood that the main epicyclic group B comprises two variables, i. e. the sun pinion E and the annulus D, each of which are driven independently from a single source of power. Therefore by fitting the input shaft, or the auxiliary shaft, or both with change speed gear groups, as hereinafter explained, these two variables may both be selectively driven at the same or different speeds, or one may be held stationary so that a great number of speed changes are available for the output shaft.

For this purpose the input shaft A is fitted with a bevel pinion a which is in engagement with two corresponding bevel pinions b and c, such pinions being respectively mounted freely on shafts d and e which are in mutual alignment, and can drive the sleeve A' which can be engaged at will with either of the pinions b or c thereby imparting to the shafts d and e a drive in either direction according as the sleeve A' is engaged with pinion b or c. The shaft d is adapted to actuate two epicyclic speed groups O, P whilst the shaft e carries two similar speed groups Q, R. To actuate the groups O, P, the shaft d has a disc f fitted with stub axles g to carry the planet wheels h of the group O and which axles are also designed to carry the internally toothed annulus k of the associated group P. The planet wheels h are in engagement on one side with a sun pinion l and on the other side with an internally toothed annulus m which is extended laterally so as to form a carrier disc n for the planet pinions o of the group P. The disc n is carried on one end of a sleeve p, the other end of which carries the gear wheel G. The planet wheels o are in gear on one side with the toothed annulus k and on the other side with a sun pinion q forming part of a disc r formed with a reaction drum s, fitted to which is a band brake t by which the sun pinion q may be locked when necessary. In a similar way the sun pinion of the group O is carried on a disc u on which is formed a drum v adapted to be braked by the band w. By such an arrangement it will be understood that two epicyclic gear trains are provided in the group O which are each capable of giving out a predetermined gear ratio according to which of the reaction drums s or v is held stationary. In either case by the sleeve p the gear wheel G is rotated at the speed desired and this in turn drives the gear H on the auxiliary sleeve F to drive the sun pinion E on the main epicyclic group B. As shown in the figure the gears G and H give a reduction drive, but this may be modified as desired to give an equal or multiplying drive.

There is provided on the shaft e two speed groups Q, R and these comprise two epicyclic gear trains similar to those already described in connection with the speed groups O, P, on the shaft $d$ and a resulting speed will be given to the sleeve $p'$ which in turn will drive the gear wheel J to thereby actuate the gear K and thus the internally toothed annulus D of the main epicyclic group B. The annulus D is formed on a disc $x$ carried by a sleeve $y$ on the output shaft $c$ and the end of the sleeve is fitted with a brake drum $z$ having a brake band 10. Similarly the sun pinion E is carried on one end of a sleeve 11, the other end of which is fitted with a drum 12 fitted with a band brake 13 so that when desired the sun pinion may be locked. Thus the sleeves $y$ and 11 make up the auxiliary shafts F which are concentric with the output shaft C. As already described the planet wheels L are carried by a disc N fixed on the output shaft C. Therefore depending upon the relative speeds given to the annulus D and the sun pinion E, so the planet wheels L of the main epicyclic group B, will receive a resultant orbital movement to thus actuate the output shaft C.

The epicyclic trains of the speed groups O, P, Q, R may be of any form desired, those which are shown being by way of example. They may be constructed so as to individually give any desired ratio, for instance one may be 3 to 1 and the other may be 1.5 to 1. Many other combinations are possible by choosing an appropriate combination which may be further modified by the use of either one of the brakes 10 or 13, or of both where a certain amount of slip is allowed.

Figure 2:
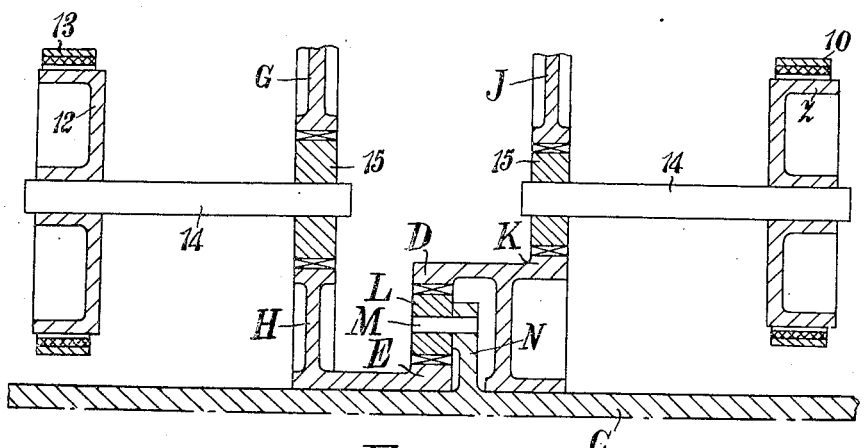
Figure 2 is a modified form of the gearing shown in Figure 1.

It may be of advantage in some cases to secure a larger space between the axis of shafts $d$ and $e$ and the axis of the output shaft C. This may be provided for by the arrangement of an intermediate shaft such as 14 in Figure 2 fitted with idler wheels 15.

Such idlers engage in one case between the spur wheels G, H and in the other case between J, K. In this modification the brake drums 12 and Z are mounted on the intermediate shafts 14.

The modification shown in Figure 3 illustrates a somewhat more compact arrangement of the gearing in which the input shaft A is parallel with the output shaft C. In this case two speed groups Q, R similarly to those in Figure 1, are provided for the input shaft A, and two speed groups O, P for the output C. The arrangement in detail is as follows:

The input shaft A has a sun pinion 16 in engagement with planet wheels 17 and these in turn drive an annulus 18 which may be braked at 19. This forms the first of two epicyclic trains, the other comprising planet wheels 20 which on one side engage a sun pinion 21 and a toothed annulus 22 on the other. The sun pinion 21 is carried loosely on the input shaft A by a disc 23, having a drum 24 that may be braked as at 25. The toothed annulus 22 is extended laterally to act as a carrier for the planets 17 of the first train, and the annulus 18 is also extended laterally to act as a carrier for the planets 20 of the second train. The planets 17 are also carried upon a disc 26 fitted upon an extension 27 of the input shaft A which in its turn carries a gear wheel 28 keyed thereon, the gear 28 being fitted with a flange 29 forming a brake drum fitted with a band brake 30. The gear wheel 28 engages with a companion gear 31 loosely mounted on the output shaft C. Such gear wheel 31 carries the internally toothed annulus D of the main epicyclic group B as referred to in Figure 1. It will be understood that by the use of the brake bands 19, 25, various speeds may be imparted to the toothed annulus D and the latter be locked or allowed to slip by means of the brake band 30, this constituting one of the variables of the main group. The other variable is constituted as follows:

The input shaft A carries a spur wheel 32 in mesh with a companion spur wheel 33 on an auxiliary shaft 34 which is in alignment with the output shaft C. Auxiliary shaft 34 has a sun pinion 35 which forms a drive for the two variable speed groups O, P, which are similar to the two speed groups Q, R, which include similar epicyclic trains as used in connection with the input shaft, and bear the same reference numerals with the addition of the letter $a$. Thus depending upon which of the brakes 19$^a$ or 25$^a$ is in action, so a definite resultant orbital rotation will be given to the planets 17$^a$. Such planets are carried by a disc 36 fixed on a stub shaft 37 that terminates in the sun pinion E of the main epicyclic group B. The disc 36 provides a drum 38 furnished with a brake drum 39. Thus the sun pinion E may be given one of two speeds or may be held stationary. The planets L of the main group therefore receive an orbital rotation as the result of the particular speed groups which are operatively selected, such rotation being imparted to the disc N and thus to the output shaft C.

Referring now to Figure 4, a very compact form of gearing according to the invention is shown in which the two principal shafts are concentrically arranged. For this purpose A is the input shaft and C the output shaft. The input shaft A by means of bevel pinions $a$ drives a companion bevel pinion $b$ splined upon a sleeve 40 and such sleeve at its opposite extremities carries a sun pinion 41 and 42 respectively. The pinion 41 initiates a drive for the speed groups Q, R, in a manner similar to that described in the other modifications through two epicyclic trains. Depending upon which of the brakes 19 or 25 is actuated so a definite orbital rotation is imparted to the planets 17 by which the disc 26 is rotated. Such disc is keyed upon a centre shaft 43 that extends longitudinally through the sleeve 40 and terminates in the sun pinion E of the main epicyclic group B. In a similar manner the sun pinion 42 on the sleeve 40 actuates either of the speed groups O, P whereby the annulus D of the main group B receives its predetermined speed. Thus the planets L of the main group receive a resultant orbital rotation whereby the disc N on the output shaft C is rotated. Further additional speeds are obtained as before by the brake band 25$^a$ for the pinion E and by the brake 30 for the annulus D.

For the sake of convenience, similar epicyclic trains for the speed groups O, P, Q, R have been shown in all the modifications but it is to be understood, that any and different forms of epicyclic gearing may be used depending upon circumstances.

By such an arrangement of speed groups and epicyclic elements, a very wide manipulation is possible and many speed ratios are obtainable by choosing the appropriate combinations. For example, eight different speed ratios are possible which possess the characteristic that for low speeds, the intervening steps are substantially different whilst for the higher speeds the intervals present but small differences. A still further increase in the number of changes possible, may be obtained by including in each of the speed groups a direct drive.

From the foregoing construction it will be appreciated that a very flexible power transmission drive is provided in which many speed changes are provided. Moreover, the construction as described allows of a large over-all variable ratio and with the successive speed ratios which are obtainable, the low speeds will have substantial intervals between them, but for the upper speeds the intervals or successive steps will be relatively very close. Again, it is possible to obtain reasonable speeds of rotation of the various parts or gears at all speeds and finally there will be reasonable brake reactions for all the various gear ratios.

Such a power transmission drive may be used for many purposes and amongst other uses may be adapted for driving self-propelled vehicles. When these are of the heavy duty type, such a transmission offers great advantages owing to the convenience it offers of being fitted in the chassis frame, and to the ease by which such a vehicle may be driven over rough and uneven ground, and manoeuvred at speed.

I claim:

In a variable power transmission unit, the combination of a driving shaft and a driven shaft, a set of planets operatively connected with said driven shaft and forming part of a main epicyclic group of gears including a sun pinion and annulus, means for driving the sun pinion from said driving shaft, means for driving said annulus from said driving shaft independently of said last mentioned means, said driving means including variable selective driving mechanism comprising a series of auxiliary epicyclic gear groups, brake bands for controlling the operation of the auxiliary epicyclic gear groups, and means for directly braking the sun pinion and annulus of the main epicyclic group, whereby the drive imparted to said group from the remaining auxiliary epicyclic groups constituting the variable selective driving mechanism can be still further modified with corresponding additional variation in the orbital rotation of the planets of said main group and the driven shaft to which they are connected.

WALTER GORDON WILSON.